UNITED STATES PATENT OFFICE.

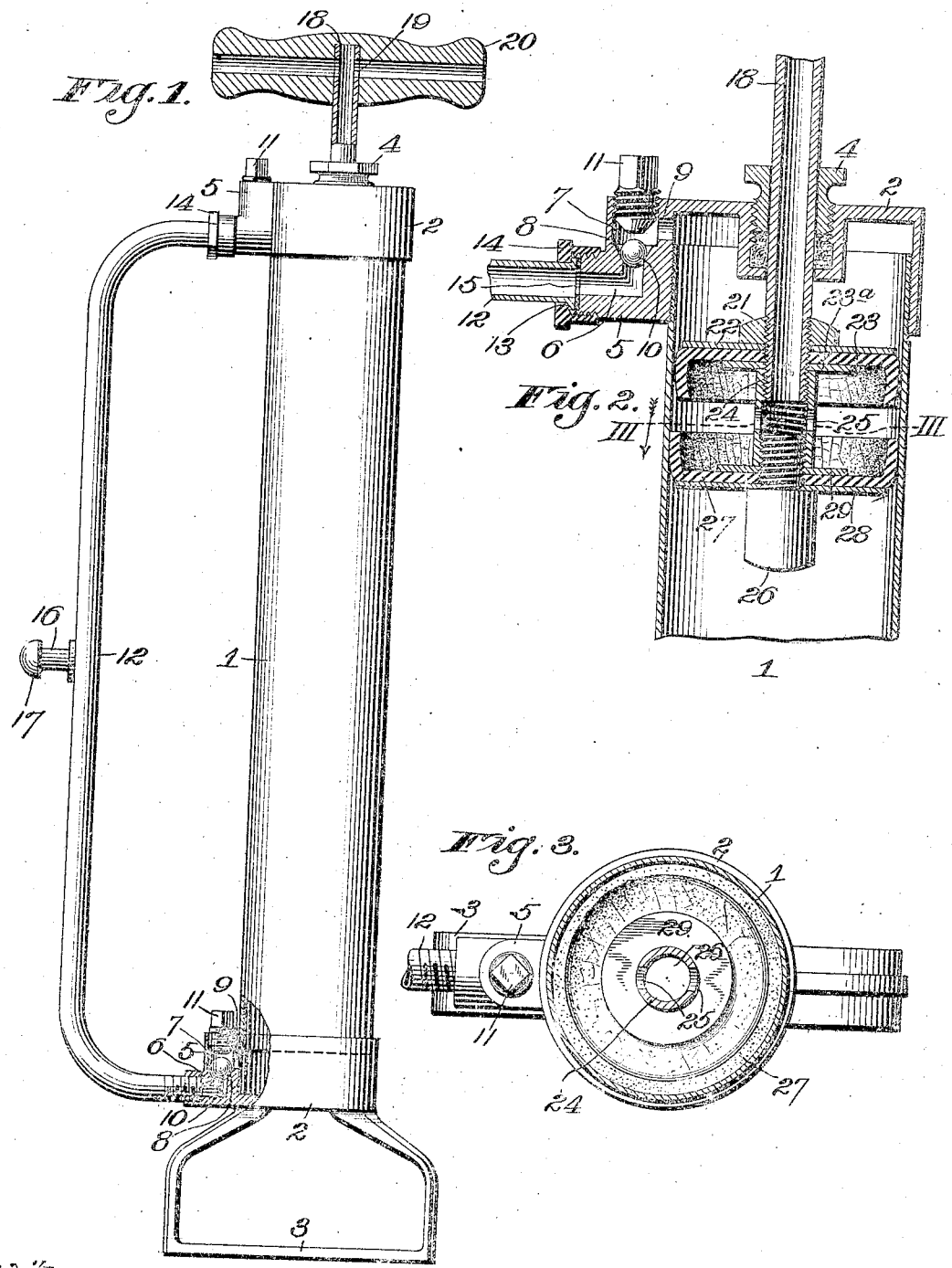

NAPOLEON W. DIBLE, OF KANSAS CITY, MISSOURI.

AIR-PUMP.

No. 827,714.  Specification of Letters Patent.  Patented Aug. 7, 1906.

Application filed October 4, 1904. Serial No. 227,103.

*To all whom it may concern:*

Be it known that I, NAPOLEON W. DIBLE, a citizen of the United States, residing at Kansas City, in the county of Jackson and State of Missouri, have invented certain new and useful Improvements in Air-Pumps, of which the following is a specification.

This invention relates to air-pumps, and more particularly to a double-acting air-pump for creating a vacuum; and my object is to produce an efficient and reliable pump of this character.

To this end the invention consists in certain novel and peculiar features of construction and combinations of parts, as hereinafter described and claimed, and in order that it may be fully understood reference is to be had to the accompanying drawings, in which—

Figure 1 represents a pump embodying my invention, the same being shown partly in side elevation and partly in section. Fig. 2 represents an enlarged central vertical section of the upper part of the pump with the piston-stem broken away. Fig. 3 is a horizontal section taken on the line III III of Fig. 2.

In the said drawings, 1 designates the body of the pump having its ends closed by caps or heads 2, the relation between the body and the heads being preferably a threaded one, as shown. The lower cap or head is provided with a depending stirrup or foothold 3, and the upper one is equipped with a packing or stuffing box 4. At corresponding sides the heads or caps are provided with enlargements 5, having angular passages 6, enlarged at their upper ends, as at 7, and formed with valve-seats 8 at the lower end of said enlarged portions, the latter also communicating by way of passages 9 with the interior of the pump.

10 designates ball-valves seated by gravity on seats 8, and 11 screw-plugs closing the upper ends of the passages and limiting the unseating or upward movement of the balls.

The enlargement 5 of the lower head or cap has the end of its passage below the ball internally threaded to receive the threaded end of a tube 12, the opposite end of said tube being formed with a flange 13, and journaled on said end and held thereon by said flange is an internally-threaded coupling-nut 14 for engagement with the externally-threaded end of the upper enlargement 5, a gasket 15 being interposed between the flanged end of said tube and said upper enlargement to make the joint therebetween air-tight. At a suitable point, preferably midway its length, tube 12 is provided with an offsetting-tube 16, having an enlargement or head 17 for securing upon said tube the end of a rubber or equivalent tube, (not shown,) said rubber tube being adapted to lead to the chamber from which the air is to be exhausted.

18 designates the piston rod or stem, the same being hollow and provided with an air-exit opening or openings 19 at or near its upper end, and mounted on said end is a tubular handle 20 to conduct the air from openings 19 to the atmosphere. The piston-stem extends slidingly through the stuffing-box 4, and screwed thereon is a nut 21, and fitted upon the stem below the nut is a washer 22 and a flexible inverted cup-leather 23. Screwed upon the stem and clamping the cup-leather firmly between said washer and a washer 23ª is a tube 24, provided with one or more openings 25, establishing communication between the interior of the pump and said tubular stem. Screwed into the lower end of said tube is a bolt 26, and fitting upon the same is a flexible cup-leather 27, a washer 28, and a washer 29, the cup-leather being clamped firmly between the washers.

When the pump is operated by grasping its handle and reciprocating the piston, air is drawn alternately through the upper and lower halves of tube 12 from tube 16, and with each reciprocation air is exhausted through the tubular piston-stem. When the piston moves upward, as illustrated in Fig. 2, the suction of the air through the lower half of tube 12 raises the ball-valve 10 of the lower enlargement from its seat, so as to charge the pump below the piston. At the same time the compression of the air in the upper part of the pump holds the upper ball-valve 10 down upon its seat and causes the expansion of the cup 27 and the collapse of the inverted cup—that is to say, causes the wall of the inverted cup to bend inward, as shown, so that the air above the piston may pass the inverted cup and escape to atmosphere through openings 25, the tubular stem, openings 19 thereof, and the tubular handle. As the piston moves downward the cup 27 collapses and the inverted cup expands, the former compressing the air to hold the lower ball-valve seated, so that such compressed air may pass the collapsed cup-leather and escape to atmosphere by following the course heretofore traced. As the piston descends the air enters the upper part of the pump by way of the upper half of tube 12, incidentally raising the ball-valve 10 from its seat and holding it in such position until the downward movement of the piston ceases. All succeeding operations are repetitions of those described.

From the above description it will be apparent that I have produced a double-acting air-pump possessing the features of advantage enumerated as desirable in the statement of the object of the invention, and which, furthermore, is of simple, strong, durable, and comparatively inexpensive construction.

Having thus described the invention, what I claim as new, and desire to secure by Letters Patent, is—

1. A double-acting pump, comprising a body portion, passages communicating with each end of said body portion, movable valves closing said passages, a hollow piston-stem extending slidingly through one head of the body and communicating with the atmosphere at its upper end, a perforated tube secured on the lower end of said piston-stem with its perforations establishing communication between said stem and the interior of the pump, an inverted flexible cup-leather movable with the stem, above the perforated part of said tube, and a flexible cup-leather movable with the stem, below the perforated part of the tube.

2. A double-acting pump, comprising a body portion, passages communicating with each end of the body portion, movable valves closing said passages, a hollow piston-stem extending slidingly through one head of the body and provided with one or more perforations at its upper end, a tubular handle secured upon said upper end and having its bore registering with said perforations, a perforated tube secured on the lower end of said piston-stem with its perforations establishing communication between said stem and the interior of the pump, an inverted flexible cup-leather movable with the stem above the perforated part of said tube, and a flexible cup-leather movable with the stem below the perforated part of the tube.

3. A double-acting pump, comprising a body portion, passages communicating with each end of said body portion, movable valves closing said passages, a hollow piston-stem extending slidingly through one head of the body and communicating with the atmosphere, a tube screwed upon the lower end of said stem and provided with one or more perforations below said stem, a nut screwed upon the stem above said tube, a washer fitting on the stem below the nut, an inverted flexible cup-leather clamped upon the stem between the washers, a bolt screwed into the lower end of said tube, washers upon the bolt and between its head and the lower end of said tube, and a flexible cup-leather clamped between the washers.

4. A double-acting pump, comprising a body portion provided with a foothold, passages communicating with each end of said body portion, movable valves closing said passages, a hollow piston-stem extending slidingly through one head of the body and communicating with the atmosphere at its upper end, a perforated tube secured on the lower end of said piston with its perforations establishing communication between said stem and the interior of the pump, an inverted flexible cup-leather movable with the stem above the perforated part of the tube, and a flexible cup-leather movable with the stem below the perforated part of the tube.

In testimony whereof I affix my signature in the presence of two witnesses.

NAPOLEON W. DIBLE.

Witnesses:
H. C. RODGERS,
G. Y. THORPE.